Patented Apr. 4, 1944

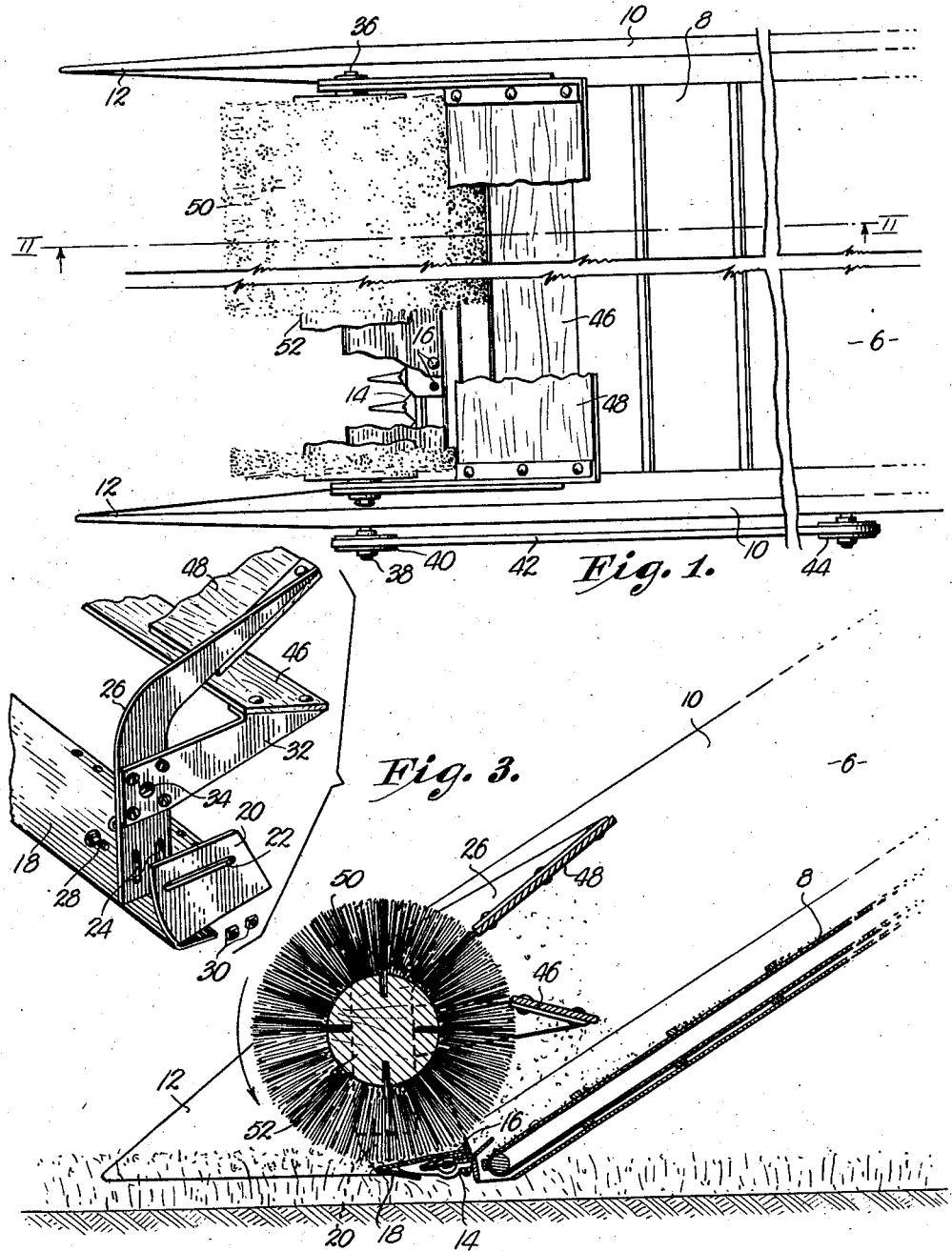

2,345,969

UNITED STATES PATENT OFFICE 2,345,969

SEED GATHERING ATTACHMENT FOR FARM IMPLEMENTS

Herschell Oden Halley and Richard Bryan Thompson, Belton, Mo.

Application February 9, 1942, Serial No. 430,014

4 Claims. (Cl. 56—128)

This invention relates to farm implements of the character employed in gathering hay and seeds of various crops, and has for its primary object the provision of a unitary attachment for combines, mowing machines or the like, which attachment may be secured as a body to an element of the said implement.

One of the important aims of the instant invention is to provide a unitary seed gathering attachment for farm implements, which attachment is designed particularly for securement directly to the sickle assembly of an implement, such as a combine or mowing machine.

A yet further aim of the present invention is the provision of a seed gathering attachment of the aforementioned character, having as a component part thereof an unique element for anchoring the attachment in place, which element serves to preclude normal function of the sickle assembly and to present a straight striking edge for the crop being handled.

Other objects of the invention include the provision of a unitary seed gathering attachment, having as a part thereof, a number of cooperating members, all of which are mounted and carried by the aforesaid anchoring attachment.

Other objects of the invention will appear during the course of the following specification, referring to the accompanying drawing wherein:

Fig. 1 is a fragmentary condensed top plan view of a farm implement, having a sickle assembly, illustrating the unitary seed gathering attachment, made in accordance with this invention in its operative position.

Fig. 2 is a fragmentary vertical longitudinal sectional view taken on line II—II of Fig. 1; and Fig. 3 is a perspective view showing in a fragmentary manner, the anchoring shield and parts directly mounted thereon.

The preferred embodiment of the invention is illustrated in the accompanying drawing, wherein like reference characters refer to similar parts throughout the several views.

The illustrated exemplification of the invention reveals the same embodied in a unitary attachment mounted upon the feeder of a combine broadly designated by the numeral 6 and including an elevator canvas 8. Conveyor side walls 10 and dividers 12 are a part of feeder 6 as is the sickle assembly, broadly indicated by the numeral 14. Parts of sickle assembly 14 are secured together by conventional bolts 16 and it is through the medium of these bolts that the unit is held in place adjacent to sickle assembly 14.

The attachment per se comprises a shield 18 formed of sheet metal or similar substance, into a body that is V-shaped in cross sectional contour. This shield 18 extends at least partially around sickle assembly 14 to preclude any cutting action thereof. Shield 18 has brackets 20 integral therewith and extending upwardly therefrom at each end. Slots 22 formed in each bracket intersect slots 24 provided in arm 26. Arm 26 and bracket 20 are releasably secured together and held for adjustment by bolts 28 and nuts 30.

Another arm 32 rigid to arm 26 is disposed as shown in Figs. 2 and 3. A bearing 34 is provided by arms 26 and 32 to journal stub shafts 36 and 38, the latter being provided with a pulley wheel 40, over which passes belt 42 from a source of power, not here shown, and which drives pulley 44.

Flat deflectors 46 and 48 are secured to arms 32 and 26 respectively. These deflectors have the straight edges thereof in direct proximity with the free ends of bristles 50 forming a part of brush 52. This brush 52 is carried by stub shafts 36 and 38 and is disposed in such relation with respect to shield 18 as to cause the free ends of bristles 50 to pass immediately adjacent thereto during the operation of the attachment.

From the foregoing it is obvious to one skilled in the art that the seed gathering attachment may be moved to and from its operative position as a unit. When mounted upon an implement having a sickle assembly the shield 18 not only serves as an anchoring means but as a guard against the grasses being cut. If desired, the sickle drive may be disconnected when shield 18 is in place, but such is not necessary and the operation of the sickle assembly in a normal manner may continue without effecting the efficiency of our attachment.

Both of the deflectors 46 and 48 are disposed rearwardly of brush 52 in normal operation, but in the event it is desired to use this brush to move cut hay into the feeder, deflector 48 and its supporting arms 26 may be reversed to place deflector 48 in front of the brush. When such is done the direction of rotation of brush 52 is reversed from the normal, indicated by the arrow in Fig. 2, in any way that the operator desires.

This additional function of a unitary seed gathering attachment, is merely an indication of the utility and simplicity of the entire assembly. When the attachment is employed under normal conditions, it is exceedingly efficient in gathering Lespedeza seed, but the invention is not confined to such use.

It is realized that seed gathering attachments having physical characteristics different from those illustrated and described, might be made without departing from the spirit of the invention or scope of the appended claims.

Having thus described the invention, what is claimed as new and desired to be secured by Letters Patent is:

1. A unitary seed gathering attachment for farm implements having a sickle assembly, comprising a shield formed to extend around the sickle assembly to preclude its cutting action; a bracket at each end respectively of the shield; arms mounted on the brackets extending upwardly and rearwardly of the sickle assembly; a brush rotatably carried by the arms having radial bristles, the free ends whereof pass immediately above the shield when the brush is rotated; a deflector secured to the arms and extending longitudinally of the brush with one edge of said deflector adjacent to the free ends of the bristles of the brush; and means for rotating the brush.

2. A unitary seed gathering attachment for farm implements having a sickle assembly, comprising a shield formed to extend around the sickle assembly to preclude its cutting action; a bracket at each end respectively of the shield; arms mounted on the brackets extending upwardly and rearwardly of the sickle assembly; a brush rotatably carried by the arms having radial bristles, the free ends whereof pass immediately above the shield when the brush is rotated; deflectors secured to the arms and extending longitudinally of the brush with one edge of each adjacent to the free ends of the bristles of the brush; and means for rotating the brush, said arms and the said brackets being provided with intersecting slots, said slots having bolts therethrough whereby to move the arms, said deflectors and the said brush with respect to the shield.

3. A unitary seed gathering attachment for farm implements having a sickle assembly, comprising a shield formed to extend around the sickle assembly to preclude its cutting action; a bracket at each end respectively of the shield; arms mounted on the brackets extending upwardly and rearwardly of the sickle assembly; a brush rotatably carried by the arms having radial bristles, the free ends whereof pass immediately above the shield when the brush is rotated; deflectors secured to the arms and extending longitudinally of the brush with one edge of each adjacent to the free ends of the bristles of the brush; and means for rotating the brush, said shield being V-shaped in cross section to present a continuous edge below the brush, one leg of said shield having means for securing the shield to the sickle assembly.

4. A unitary seed gathering attachment for farm implements having a sickle assembly, comprising a shield having a portion formed to extend around the sickle assembly to preclude its cutting action and having another portion formed to rest throughout its length on the sickle assembly; means for securing said last-named portion to the sickle assembly; a bracket at each end respectively of the shield; upper and lower pairs of arms mounted on the bracket and extending rearwardly therefrom; a brush rotatably carried by the arms having radial bristles, the free ends whereof pass immediately above the shield when the brush is rotated; a deflector secured to the upper pair of arms with its forward edge extending downwardly to a point adjacent the free ends of said bristles; a deflector secured to the lower pair of arms with its forward edge extending upwardly to a point adjacent the free end of said bristles; and means for rotating said brush.

HERSCHELL ODEN HALLEY.
RICHARD BRYAN THOMPSON.